(12) United States Patent
Tran et al.

(10) Patent No.: US 7,929,683 B1
(45) Date of Patent: Apr. 19, 2011

(54) SYSTEMS AND METHODS FOR MANAGING A NUMBERING PLAN AREA SPLIT WITH LRN ROUTED CALLS

(75) Inventors: Nhan Thanh Tran, Lawrenceville, GA (US); John Thomas Hursey, Lawrenceville, GA (US); Alan Johns, Stone Mountain, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1028 days.

(21) Appl. No.: 11/247,749

(22) Filed: Oct. 7, 2005

(51) Int. Cl.
H04M 7/00 (2006.01)
H04W 4/00 (2009.01)
H04W 40/00 (2009.01)

(52) U.S. Cl. ......... 379/221.01; 379/221.08; 379/221.13; 455/433; 455/445

(58) Field of Classification Search ............. 379/221.01, 379/221.09, 221.14, 213.01; 370/392; 455/433, 455/432.1, 411, 445
See application file for complete search history.

(56) References Cited

U.S. PATENT DOCUMENTS

| | | | |
|---|---|---|---|
| 6,289,095 B1 * | 9/2001 | Buttitta et al. ............ | 379/220.01 |
| 6,553,116 B1 * | 4/2003 | Vander Meiden ....... | 379/355.08 |
| 6,636,868 B1 * | 10/2003 | Bauer et al. ................. | 707/104.1 |
| 6,850,611 B1 * | 2/2005 | Chalk ....................... | 379/221.01 |
| 7,079,853 B2 * | 7/2006 | Rathnasabapathy et al. . | 455/461 |
| 7,139,385 B2 * | 11/2006 | Stroud et al. ............. | 379/221.13 |
| 7,372,954 B2 * | 5/2008 | Stroud et al. ............. | 379/221.13 |
| 7,466,814 B1 * | 12/2008 | Fries et al. ............... | 379/221.14 |
| 7,529,361 B2 * | 5/2009 | Stroud et al. ............. | 379/221.13 |
| 2003/0138095 A1 * | 7/2003 | Stroud et al. .................. | 379/230 |
| 2004/0024765 A1 | 2/2004 | Bauer et al. | |

FOREIGN PATENT DOCUMENTS

WO   WO 99/21386 A2   4/1999

\* cited by examiner

*Primary Examiner* — Fan Tsang
*Assistant Examiner* — Mohammad Islam
(74) *Attorney, Agent, or Firm* — Parks IP Law LLC; Mickki D. Murray, Esq.

(57) ABSTRACT

To route calls in a wireless network in which an NPA split has been implemented, an intelligent router mediates NPA mismatches by modifying requests for routing information according to a rule set based on the update status of the HLR or other network element to which the routing requests are directed. According to whether the intended network element has been updated to recognize a new NPA in the directory number, the appropriate version of the directory number is included in the routing request, regardless of whether the old or the new version of the directory was actually dialed. In some embodiments, the intelligent router first modifies the routing request to include the new version of the directory number, and upon receiving an error from the intended element, resends the request with the old version. Receiving an error may prompt the intelligent router to trigger an update of the intended element.

22 Claims, 4 Drawing Sheets

SYSTEMS AND METHODS FOR MANAGING A NUMBERING PLAN AREA SPLIT WITH LRN ROUTED CALLS

TECHNICAL FIELD

This invention relates generally to telecommunications systems, and in particular to systems and methods for managing a numbering plan area (NPA) split in a LRN routed call processing environment.

BACKGROUND OF THE INVENTION

In the United States, directory numbers (DNs) are administered according to the North American Numbering Plan (NANP). The area served by the NANP is divided into smaller Numbering Plan Areas (NPAs), each identified by a three-digit NPA code, commonly called an area code. When the geographic or non-geographic area associated with a particular NPA substantially exhausts a large proportion of its DNs, it becomes necessary to create a new NPA that is assigned to new subscribers in the area (NPA overlay) or to a certain segment of the existing subscribers (NPA split) to increase the DNs that can be assigned in the area. Typically, a new NPA code is required when the 800 or more of the central office codes (NXXs) in the NPA are assigned or otherwise unavailable.

More specifically, an NPA is generally split by creating at least one new NPA, assigning the new NPA to a portion of the subscribers in the overburdened area, and retaining the old NPA for the remainder of the subscribers in the area. Thus, an NPA split typically changes the mobile directory numbers (MDNs) of at least some of the wireless devices in the affected area.

To implement an NPA split in the context of a typical GSM (Global System for Mobile communications) wireless network, an update is pushed to the Home Location Register (HLR) and to other affiliated network elements that are associated with the affected wireless devices. The HLR maintains a service subscription record for each wireless device, the record including: a non-dialable, permanent identifier unique to the wireless device, such as an IMSI; the dialable and portable MDN, which is stored in the format referred to as an MSISDN (Mobile Station International Integrated Service Digital Network Number), according to the E164 standard defined by the ITU-T (International Telecommunications Union—Telecommunications Standardization Sector); and various other subscriber data. The term "update" is commonly used to refer to the process by which a network element or device is accessed to add, delete, reorganize, or revise subscriber data and/or software. In the context of an update pursuant to an NPA split, HLR records are updated at least in part by modifying the MSISDN associated with each affected device to replace the old NPA with the new NPA. Another update must be provisioned, preferably over-the-air (OTA), to each affected device to change the locally maintained MSISDN, which may be stored in a memory module such as a Subscriber Identity Module (SIM) card.

For an HLR update to be successful, it must be synchronized with updates of records in various other network elements that contain corresponding subscriber data. For example, the MDN associated with a subscriber or wireless device is typically maintained in the billing system, voicemail system, the data services database, and other affiliated network elements. In order to deliver the services included in the subscription and to correctly bill the subscriber, the subscriber data maintained by all of these affiliated elements must correlate with the service subscription record in the HLR. Therefore, updates are typically staged via a central provisioning system, which coordinates updates of the HLR and the affiliated networks.

Carriers are required to provide a period of permissive dialing (PD), as defined by the NANP, which allows callers to dial either the old MDN including the old NPA or the new MDN including the new NPA, and still transparently reach the intended wireless device. During the permissive dialing period, affected switches operate in a mode in which routing tables such as global title translation (GTT) tables are updated to support both the old and the new NPA. If a call is directed to a MDN that includes a preexisting NPA that is listed in tables maintained at the home switch as having been split, then the switch submits the MDN dialed as the MSISDN in a query to the home HLR to obtain routing information. The HLR maps the MSISDN submitted by the switch to the IMSI associated with the wireless device and accesses the corresponding subscriber profile, which identifies the VLR at which the mobile device is registered. However, if an incoming call is directed to a MDN including the new NPA, then the switch submits a modified version of the MDN dialed as the MSISDN. The modified version includes the old NPA. In other words, during permissive dialing, the HLR has not been updated to recognize the new NPA, so the home switch always submits the pre-split version of the MSISDN to the HLR.

In either scenario, as long as the home HLR has not been updated, there is no mismatch. However, as soon as the HLR is updated, it no longer recognizes the MDN with the old NPA, because GSM HLRs lack the ability to maintain dual records for a single wireless device. Thus, if the HLR update is performed before expiration of the permissive dialing period or before the switch leaves PD mode, any calls placed using the old NPA will experience an NPA mismatch, which may cause the call to fail. Similarly, if the HLR update is not performed after the switch is no longer able to support both NPAs, the HLR will not be able to match the MSISDN with the new NPA with an IMSI and the call fails, or the home switch has to mediate the NPA mismatch by changing the MSISDN back to the old NPA and then querying the home HLR again. This raises the difficult prospect of providing the required period of permissive dialing, while coordinating updates to the HLR, affiliated network elements, switches, and wireless devices via the central provisioning system at the end of permissive dialing to avoid NPA mismatches.

Such coordinated updates of the HLR, switches, affiliated network elements, and devices associated with ported and/or pooled MDNs affected by NPA splits involve labor and resource intensive processes, including updating the HLR service subscription records to support only the new NPAs. These processes would be ideally performed in a wholesale transaction, but the central provisioning system more realistically typically performs the transaction in batches or phases according to protocols developed by IT (Information Technology) professionals employed by the carrier, which in view of the time constraint posed by the expiration of the permissive dialing period, is still a momentous effort. The typical HLR contains several million subscriber records, so bulk updates with even low error rates can create numerous customer service issues. In general, updates can only be performed in a predefined maintenance window during non-busy hours, and thus, the work must be distributed over several days. In addition, the over-the-air provisioning of wireless devices is often limited by the batch processing capability of the network, which may allow, for example, only 4000 OTA updates per night.

In the last few years, it has become even more cumbersome during these permissive dialing periods for the wireless network to determine whether a particular MDN is actually affected by an NPA split. At least two developments come into play—wireless local number portability (WNLP) and number pooling, both of which complicate the process of routing calls by analyzing the MDN.

Prior to the advent of number pooling, each carrier was assigned one or more blocks of ten thousand (10K) MDNs and thus, each carrier owned entire central office codes (NXXs). Any MDN could be easily interpreted to identify the subscriber's home HLR, and to determine whether the serving carrier had implemented a NPA split. Number pooling decreases the number of MDNs in each assigned block to one thousand (1K), frequently resulting in more than one carrier sharing a central office code. This frustrates attempts to easily map a given NXX to its home network. WLNP further obscures the relationship between the central office code and the home network, because an individual MDN that was previously served by a first carrier may have been ported to another carrier, and thus, may no longer be physically associated with the central office identified by the NXX.

Rather, when a call is placed, a gateway exchange switch determines whether the MDN dialed is in a pooled market and whether it has been ported. In direct or indirect implementations, the respective gateway exchange of the originating network or of the network that corresponds to the owner of the number block consults a remote database, such as a Number Portability database (NPDB), to determine which carrier serves the block of 1000 numbers that encompass the MDN. The NPDB responds with the Local Routing Number (LRN) that corresponds to the block or, if the MDN has been ported, the LRN indicates the carrier that serves the individual MDN. As defined in the GSM specification for supporting Number Portability, an Initial Address Message (IAM) is populated with the MDN (as a MSISDN) in the GAP (Generic Address Parameter) and with the LRN retrieved from the NPDB populated in the CdPN (Called Party Number). It is this LRN that identifies the home network, rather than the MDN as described above with respect to earlier systems.

In either case, the IAM is sent to the home switch (e.g., an MSC or GMSC) associated with the MDN, as identified by the LRN. When the call arrives at the home network, the NPDB may be consulted again. In response to receiving the IAM, the home GMSC requests routing information from the HLR, which returns the Mobile Station Routing Number (MSRN) that identifies the switch in the visited network to which the home GMSC is to route the call. The home GMSC forwards the MSISDN to the visited switch, which sets up the call to the called party. If the GMSC determines that the NPA has split or changed, it defaults to the old MSISDN—including the old NPA—before querying the HLR.

As described above, if the update of the HLR is not synchronized with the update of the affected switch by the end of the permissive dialing period, errors are received and the switch must mediate. For instance, if the NPA has split but the HLR has not been updated, the HLR will not recognize the new MSISDN if it is submitted and will be unable to return an MSRN to the recipient switch. If the old MSISDN is dialed, the HLR will request routing information from the visited switch using the old MSISDN, which will be unable to locate the called party that should have been identified by the new MSISDN.

Thus, current methodologies for mediating a NPA mismatch are limited by the inability of the GSM HLR to maintain dual records, and by the frequently excessive consumption of bandwidth as the network components repeatedly interact to mediate the mismatch.

It is readily apparent that what is needed are systems and methods for managing NPA splits that reduce the occurrence of errors as well as the bandwidth consumed in mediating the errors that do occur. Moreover, it is desirable for the systems and methods to be operational prior to or during the process of updating the HLR and affiliated network elements.

SUMMARY OF THE INVENTION

The various embodiments of the present invention overcome the shortcomings of the prior art by providing systems and logical methods that are implemented as an intelligent router that implements a rule set for governing NPA split processing in a wireless telecommunications network, such as a GSM network that employs LRN routing incident to number pooling, number portability, and similar protocols. The intelligent router supports call processing in a permissive dialing (PD) environment without requiring modification to subscriber data maintained by other network elements. Instead, the intelligent router modifies routing signals and messages as needed to present the appropriate version of the dialed directory number to network elements such as the HLR, thereby preventing NPA mismatches that would otherwise interrupt or delay call processing.

The intelligent router can be maintained and updated independently of the HLR and other affiliated network element, such that the rule set can be instituted as needed. For instance, the intelligent router can be enabled only for the duration of the permissive dialing period and then disabled, or can be disabled when the HLR has been comprehensively updated at or some time after the end of the mandatory permissive dialing period. Advantageously, the intelligent router at least temporarily relieves the switches and the HLR of the duty to mediate the NPA split. Rather, the intelligent router maintains the dual records for each MDN, determines whether a particular MDN is affected by an NPA split, and forwards the appropriate signaling messages that communicate the appropriate MSISDN to enable the home HLR to obtain routing information. The intelligent router thereby obviates the need for repeated signaling between the switch and the HLR and minimizes HLR access times, which in turn, reduces the time required to connect each call. The need for coordinated and wholesale updates is also obviated because the intelligent router manages the effects of an NPA split on call processing before and during the process of updating the HLR and affiliated network elements.

In certain embodiments, a single intelligent router services an entire network having any number of HLRs. In other embodiments, each HLR is serviced by an intelligent router that is dedicated to that HLR. In either scenario, the intelligent router provides the flexibility for the carrier to update both the switch (e.g., the GMSC) and the HLR as convenient or on-the-fly, because the intelligent router contains intelligence that permits it to recognize both the old and new NPA and to signal the HLR accordingly. Thus, coordination of HLR and switch updates is no longer critical, and information technology resources are no longer consumed to perform wholesale updates.

Advantageously, updates can be performed on-the-fly, in stages, or as otherwise needed. As each MDN is mediated by the intelligent router, the HLR record for that MDN can be updated with the new NPA if the MDN was affected by an NPA split. Thereby, the intelligent router can also be used to trigger an incremental network update—updating the records associated with as few as one MDN at a time. By this process, the HLR and affiliated network elements can be updated over time rather than by performing a wholesale update.

More specifically, the various embodiments of the invention involve an intelligent router that is an independent element of the wireless network, or may be integral to any suitable network node. The intelligent router maintains the status of each HLR so as to be aware of whether it has been updated, i.e., whether its records corresponding to MDNs that were affected by an NPA split have been modified to include the new NPAs. When a mobile terminated call is placed, the intelligent router provides the appropriate MSISDN to the HLR to enable successful completion of the call.

In certain embodiments, during the permissive dialing period, the intelligent router provides an MSISDN containing the old NPA to those HLRs that have not been updated, and provides an MSISDN containing the new NPA to those HLRs that have been updated. In this manner, the HLR always recognizes the MSISDN and obtains routing information without experiencing an error.

In other embodiments, the intelligent router always initially provides the new MSISDN to the HLR, including the new NPA. If the HLR has not been updated, the intelligent router receives an error message from the HLR and in response, modifies the MSISDN to include the old NPA, and resends the message. In this manner, the call will continue although the HLR has not been updated to accommodate the NPA split. The intelligent router also creates a record indicating that the MSISDN including the old NPA is to be sent for all subsequent calls, until the HLR is updated. Therefore, the NPA mismatch must only be mediated once by repeat signaling.

In any of the various embodiments, a single record in the HLR can be updated whenever a call is placed to an MDN that was affected by an NPA split. More specifically, if the intelligent router receives call directed to an MDN affected by an NPA split, and it detects that the HLR has not been updated, the intelligent router may trigger the corresponding record in the HLR to be updated, which can in turn, trigger an OTA update of the MSISDN stored on the wireless device or in the records of an affiliated network element. In this manner, each network element is updated on-the-fly as a call is placed to the corresponding wireless device.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION

Figure 1:
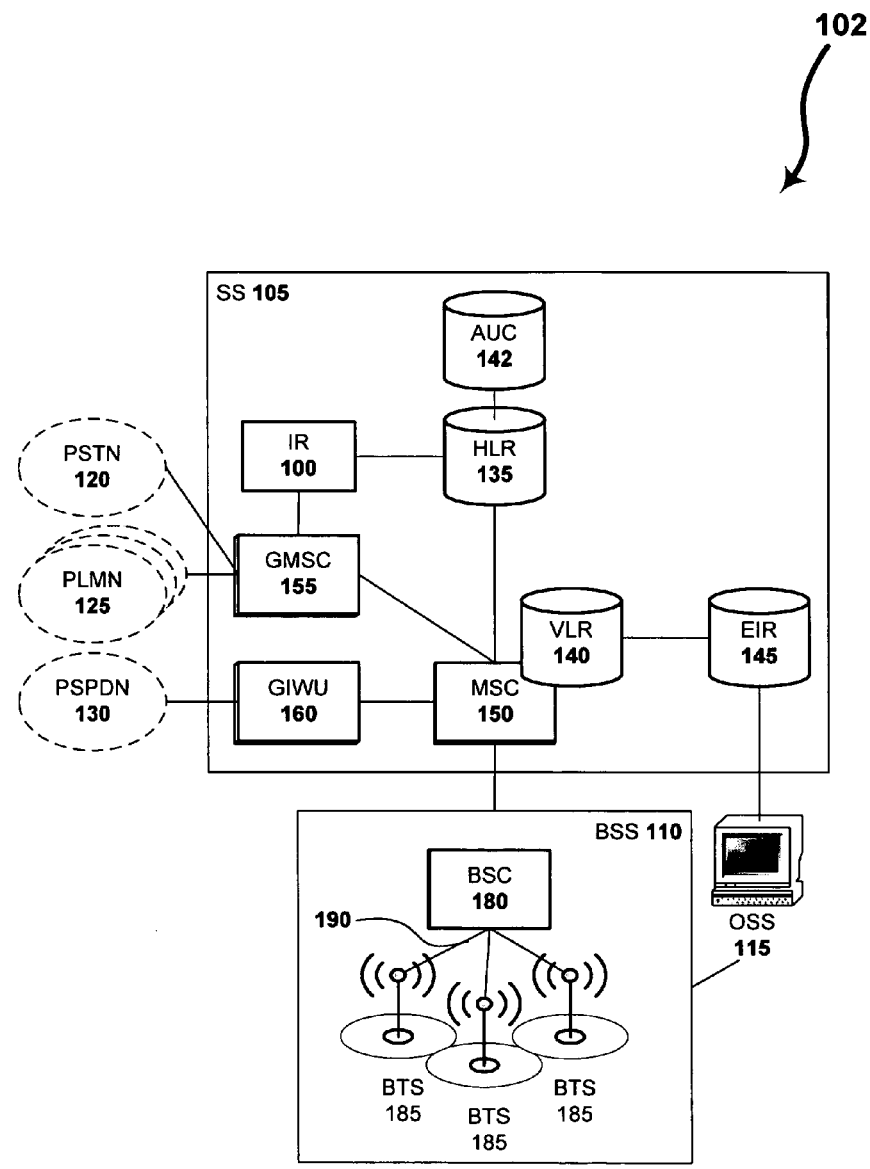
FIG. 1 is a block diagram of an exemplary wireless network incorporating an exemplary embodiment of the present invention.

As required, detailed embodiments of the present invention are disclosed herein. It will be understood that the disclosed embodiments are merely examples to illustrate aspects of the invention that may be embodied in various and alternative forms. The figures are not necessarily to scale, and some features may be exaggerated or minimized to show details of particular components. In other instances, well-known network elements, structures, or methods have not been described in detail to avoid obscuring the present invention. Therefore, specific physical, structural and functional details disclosed herein are not to be interpreted as limiting, but as a basis for the claims and for teaching one skilled in the art to variously employ the present invention.

Referring now to the drawings in which like numerals indicate like elements throughout the several views, the drawings illustrate certain of the various aspects of exemplary embodiments of an intelligent router 100 implemented in an exemplary wireless network, such as GSM network 102. Those skilled in the art will readily appreciate that the intelligent router 100 could be implemented in numerous other wireless and radio frequency data transmission systems, including networks utilizing UMTS, EDGE, TDMA, FDMA, CDMA, WCDMA, OFDM, and similar communications protocols.

As shown in FIG. 1, the exemplary GSM network 102 includes three major subsystems—namely, a switching system (SS) 105, a base station system (BSS) 110, and an operation and support system (OSS) 115. The SS 105 performs subscriber-related functions, as well as call processing within the GSM network 102 and between the GSM network 102 and other voice/data systems, such as a public switched telephone network (PSTN) 120, other public land mobile networks (PLMNs) 125, and a packet-switched public data network (PSPDN) 130. The SS 105 includes the following functional units: a home location register (HLR) 135, a visitor location register (VLR) 140, an authentication center (AUC) 142, an equipment identity register (EIR) 145, and a switch, which is commonly referred to as a mobile services switching center (MSC) 150. The SS 105 also includes at least one gateway mobile services switching center (GMSC) 155 and a GSM interworking unit (GIWU) 160.

The MSC 150 interfaces directly with at least one base station system (BSS) 110 which performs all radio-related functions for the GSM network 102. Although various configurations are possible, the BSS 110 shown in FIG. 1 includes one base station controller (BSC) 180 and three base transceiver stations (BTSs) 185. The BSC 180 is a functional entity that provides and controls the logical interconnection between the MSC 150 and the BTSs 185. The BSC 180 may be physically located with the BTS 185, or may communicate with the BTS 185 via an interface 190, such as an Abis interface. Monitoring and control functions for the GSM network 100 are performed by the operation and support system (OSS) 115. The structure and function of the illustrated elements of the GSM network 102 are known, with the exception of the intelligent router (IR) 100, and will not be described in exhaustive detail herein. It also should be noted that the network elements shown are not necessarily physical elements, but can be functional elements of the GSM network 102, the names of which may vary according to the manufacturer. For example, the acronym GIWU indicates an interworking unit manufactured by LUCENT, while the same functional element in a network manufactured by ERICSSON is called a TIGRIS.

Figure 2:
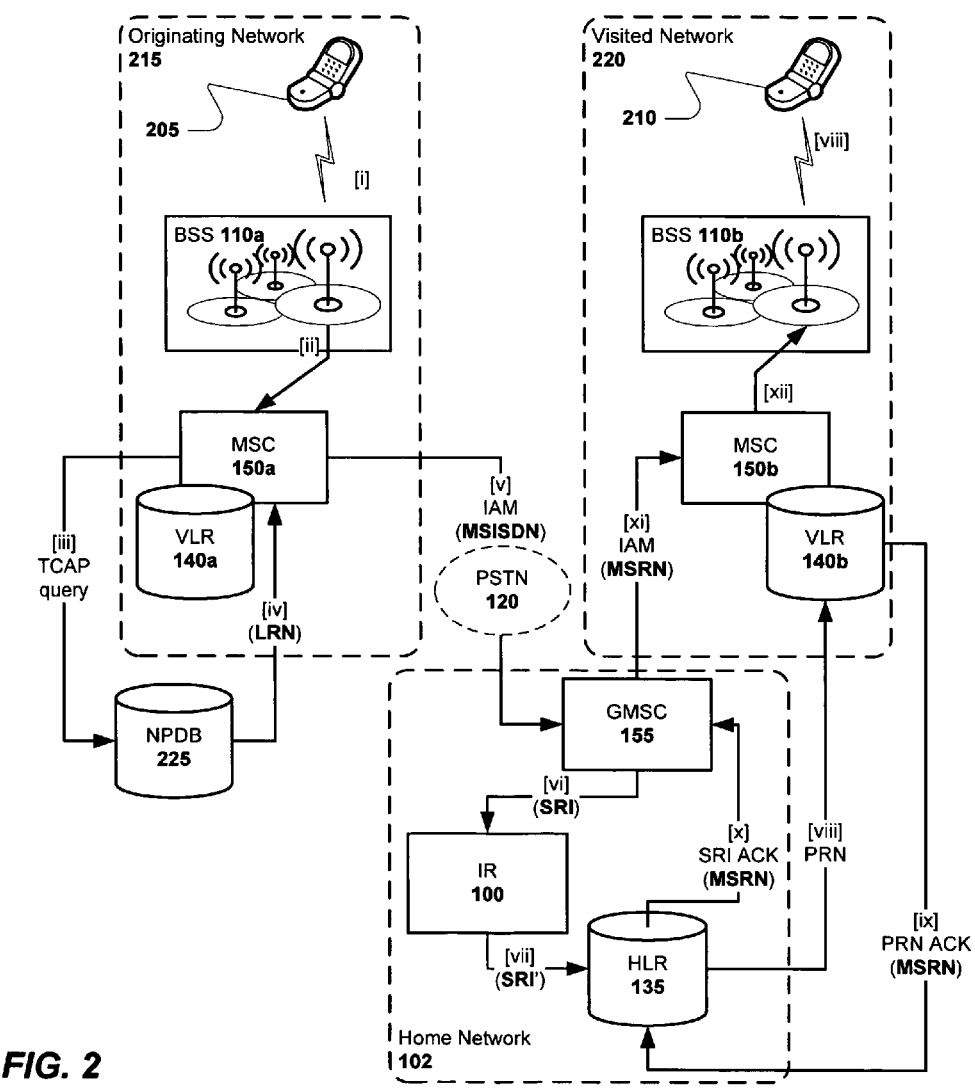
FIG. 2 is a block diagram showing an exemplary environment for implementing an intelligent router, according to certain of the various embodiments of the invention.

FIG. 2 is a block diagram showing an exemplary environment 200 suitable for teaching the various aspects of the invention, which will be described in the context of a voice call originating with wireless device 205 and terminating at wireless device 210. Thus, as many as three communications networks can be involved in completing a single call, including in this example, the home network 102, an originating network 215, and a visited network 220. The call originates when the originating wireless device 205 operating in the originating network 215 initiates a call directed to the terminating wireless device 210, which is homed in GSM network 102 but is roaming or otherwise visiting visited network 220. Either or both of the wireless devices 205, 210 can be any known or yet to be developed communications device that operates in a similar environment, including but not limited to a wireless telephone, personal digital assistant (PDA), portable or handheld computer, and the like.

Both the originating network 215 and the visited network 220 are also GSM networks, and thus, each network 215, 220 has the same or similar elements as does the home network 102. For clarity, FIG. 2 is simplified to show only the most relevant elements of each network 102, 215, 220, and an element in the originating network 215 is designated with the suffix "a" and an element in the visited network 220 is designated with the suffix "b" to indicated that the elements are equivalent to the corresponding element in the home network 102. The exemplary environment 200 also includes a Number Portability Database 225 the interaction of which will be described below.

Figure 3:
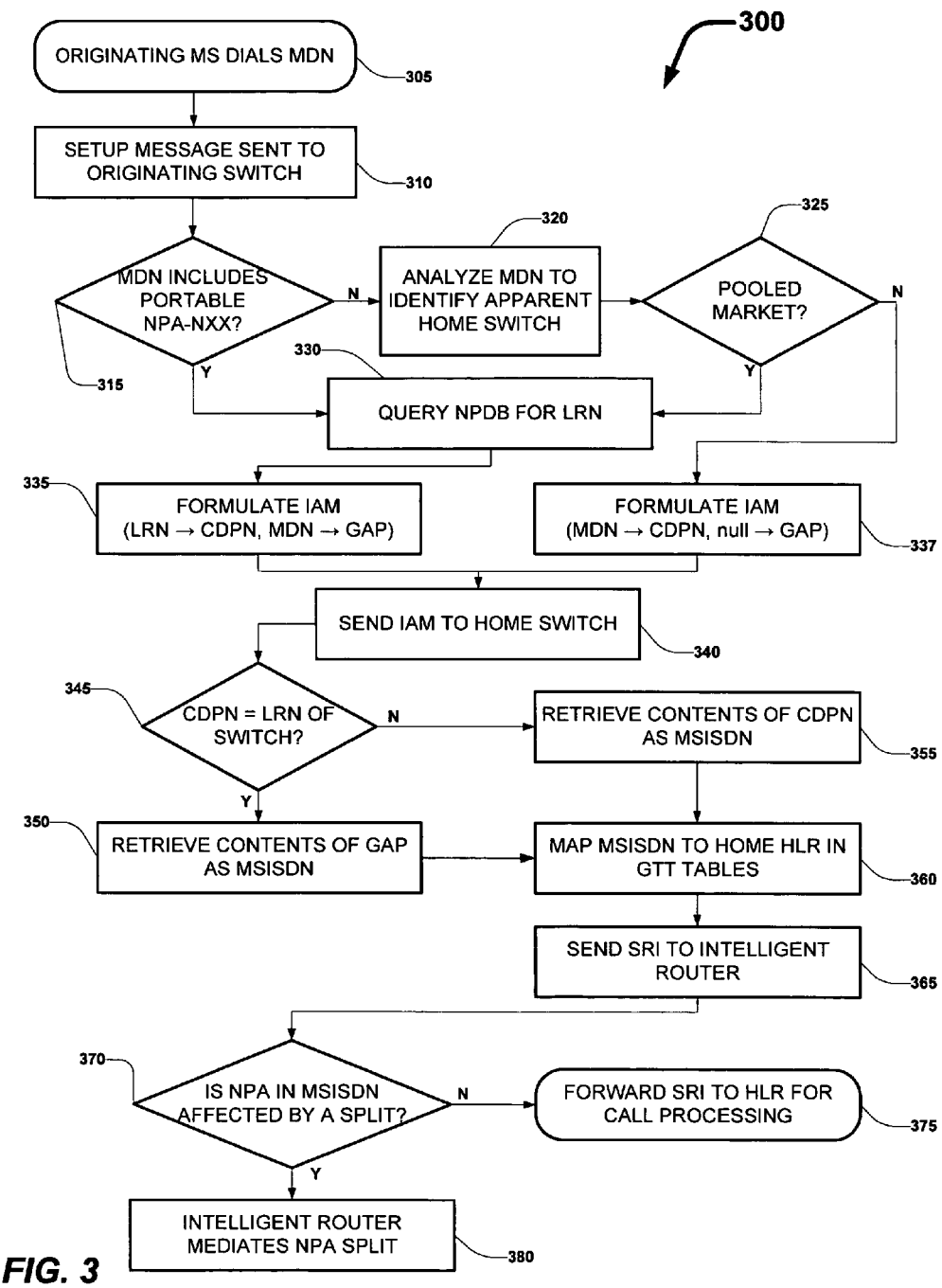
FIG. 3 is a flowchart showing an exemplary method for call routing using the intelligent router, according to certain embodiments of the invention.

In the exemplary embodiment, the terminating wireless device 210 is associated with a mobile directory number (MDN) that is in a pooled market, is portable, and/or is affected by an NPA split. As used herein, the phrase "NPA split" refers to any numbering plan relief protocol that involves altering, reassigning, or reallocating NPAs, NPA-NXX combinations, or the network elements associated with NPAs, including but not limited to traditional NPA splits, overlays, and geographical reapportionments. An exemplary method 300 for routing the voice call from the originating wireless device 205 to the terminating wireless device 210 will now be described with reference to FIGS. 2 and 3.

At step 305, a wireless subscriber (not shown) operating the originating wireless device 205 dials a mobile directory number (MDN) associated with the terminating wireless device 210, which causes establishment of a connection via the BSS 110a, and the originating wireless device 205 is authenticated and validated. At step 310, the originating wireless device 205 sends a SETUP message to MSC 150a to request the MSC 150a to initiate call setup. The SETUP message contains the MDN of the terminating wireless device 210. The MSC 150a processes the call setup by first determining whether the MDN includes an NPA-NXX sequence that is portable at step 315. If the MDN is not portable, then at step 320, the MSC 150a uses its internal global title translation (GTT) tables to perform digit analysis on the first six digits of the dialed digits to identify the apparent home switch to which it is appropriate switch to route the call. If, at step 325, the MSC 150a determines whether the apparent home switch is in a pooled market, then the number pooling protocol requires the MSC 150a to proceed to step 330 to query the NPDB 225 to retrieve an LRN that identifies the switch in network 102 on which the terminating wireless device 210 is actually homed.

If the NPA-NXX in the dialed MDN is marked as portable, then the method also proceeds to step 330, after the originating MSC 150a determines that a number portability (NP) query should be launched. A query is not required in certain circumstances, such as if the MDN is served by MSC 150a or if an NP query was already performed for the call. If no query-precluding condition exists, the MSC 150a initiates the NP query by formulating and launching an SS7 (Signaling System 7) Transaction Capabilities Application Part (TCAP) message containing information about the called party and the calling party, which prompts the NPDB 225 to provide the appropriate local routing number (LRN). In addition, a forward call indicator (FCI) or number translated indicator is set to indicate a query has been performed.

In any event, the MSC 150a formulates an initial address message (IAM). If the number is ported or pooled, then at step 335, the fields of the IAM are populated to include the LRN stored in a called party number (CdPN) parameter and the ported MDN stored as the MSISDN in a generic address parameter (GAP). If the number is not ported or pooled, then at step 337, the fields of the IAM are populated such that the GAP parameter is null and the CdPN parameter contains the MDN dialed.

A point to point ISDN User Part (ISUP) route from MSC 150a to the now identified home switch—which may be GMSC 155 or MSC 150, is determined based on the contents of the CdPN parameter. For simplicity, in the exemplary embodiment, the home switch and the GMSC 155 are the same element. Thus, at step 340, the IAM is sent via the PSTN 120 to GMSC 155 in the home network 102. As the call is routed to the home switch, any intervening switches will use the contents of the CdPN parameter to route the call. When the call reaches GMSC 155, at step 345, it compares its own LRN to the number stored in the CdPN parameter, which includes either the LRN retrieved from the NPDB 225 or the MDN. If the numbers correlate, then at step 350, the MDN actually dialed is retrieved from the GAP parameter, and the MDN then is used as the MSISDN to request routing information to direct the call to the terminating wireless device 210. If the numbers do not correlate, then at step 355, the MDN stored in the CdPN is retrieved for use as the MSISDN in the request for routing information.

At step 360, the GMSC 155 in the home network 102 also performs digit analysis on the CdPN parameter, using its GTT tables in order to identify the home HLR 135. Those skilled in the art will appreciate that, if the network 102 includes multiple HLRs, this analysis is not trivial. At step 365, the GMSC 155 requests routing information from the home HLR 135 by formulating and sending a Send Routing Information (SRI) message incorporating the MSISDN derived from the IAM. In contrast to prior art methods, this SRI message is delivered to the intelligent router 100 of the present invention, rather than directly to the HLR 135.

At step 370, the intelligent router 100 determines whether the MSISDN is affected by an NPA split. To do so, the intelligent router 100 first analyzes the digits of the MSISDN to extract the NPA, and determines whether that NPA is associated with an NPA split. To that end, the records in the intelligent router 100 are organized in tables, relational databases, or in any fashion that permits rapid access and manipulation of data. For instance, a first table in the intelligent router 100 may be organized as shown below.

| NPA-old | NPA-new | PD Expiration | HLR Status |
|---------|---------|---------------|------------|
| 111 | 222 | Feb. 1, 2006 | Updated |
| 444 | 777 | Mar. 1, 2006 | Not Updated |

Alternatively, the intelligent router 100 may retrieve any data that as necessary from another network element, such as by polling the HLR to determine its status.

If the intelligent router 100 finds that the NPA in the MSISDN extracted from the SRI appears in either the NPA-old or the NPA-new column of the table, then the NPA is associated with an NPA split. As mentioned above, in the event of an NPA split, at least some of the directory numbers that include the old NPA are subject to being modified to include the new NPA. The record associated with the NPA may also provide additional information regarding the split, including listing the expiration date for the permissive dialing period that is applicable to that particular split and the update status of the HLR.

If no split is detected, then at step 375, the intelligent router 100 simply forwards the SRI to the HLR 135 for processing. If the NPA is associated with an NPA split, the intelligent router 100 mediates the split at step 380, an embodiment of which is described in greater detail in FIG. 4.

Figure 4:
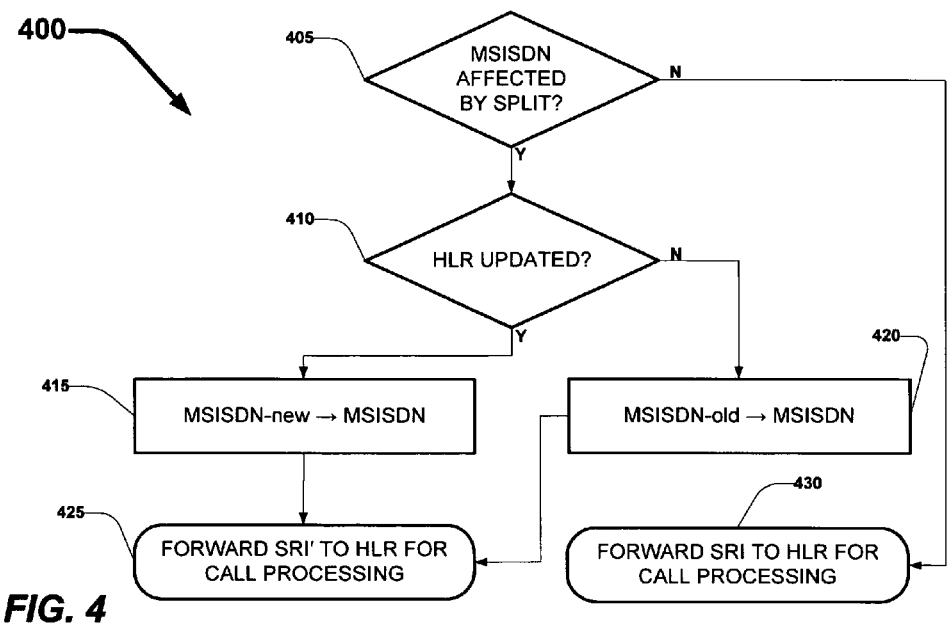
FIG. 4 is a flowchart showing an exemplary method for mediating an NPA split, according to certain embodiments of the invention.

In certain embodiments, the method 300 continues with the exemplary method 400 for mediating an NPA split that is shown in FIG. 4. At step 405, the intelligent router 100 searches its records for the MSISDN extracted from the SRI to determine whether that particular MSISDN is affected by the NPA split. Thus, a second table in the intelligent router 100 may be organized as shown below.

| MSISDN-old | MSISDN-new |
|------------|------------|
| 111-123-4567 | 222-123-4567 |
| 111-555-1212 | 222-555-1212 |
| 111-538-5787 | 222-538-5787 |

If the intelligent router 100 finds that the MSISDN extracted from the SRI appears in either the MSISDN-old or the MSISDN-new column of the table, then the MSISDN is directly affected by an NPA split. That is, the digits of the MSISDN include either an old NPA that will be eliminated or reassigned after the permissive dialing period expires, or the digits of the MSISDN include the new NPA.

At step 410, the intelligent router 100 determines whether the home HLR 135 has been updated in order to modify the SRI message, as needed, to include the appropriate MSISDN when forwarding the SRI message to the HLR 135. The potentially modified SRI is hereinafter referred to as the SRI' message. To do so, the intelligent router 100 accesses the first table and reads the HLR_Status field. In alternative embodiments, the intelligent router 100 queries the HLR 135 for a status indicator that indicates the update status of the HLR 135. In these embodiments, this query need not be performed repeatedly, because the intelligent router 100 maintains a record of the status of each HLR that it queries. The HLR_Status entry may expire after a certain period of time, such as at the end of a permissive dialing period, or at the beginning of a subsequent permissive dialing period.

If the HLR 135 has been updated, then at step 415, the intelligent router 100 ensures that the SRI' includes the version of the MSISDN that includes the new NPA or the new NPA-NXX (MSISDN-new), regardless of whether the new version was included in the SRI. If the HLR 135 has not been updated, then at step 420, the intelligent router 100 ensures that the SRI' includes the version of the MSISDN that includes the old NPA or the old NPA-NXX (MSISDN-old). After the intelligent router 100 ensures that the appropriate version of the MSISDN is in the SRI', the intelligent router 100 forwards the SRI' to the HLR 135 for call processing at step 425.

If at step 405, it is determined that although the NPA was found to be affected by an NPA split (at step 370), the particular MSISDN extracted from the SRI was not affected, then at step 430, the original SRI is forwarded to the HLR for continued call processing.

Figure 5:
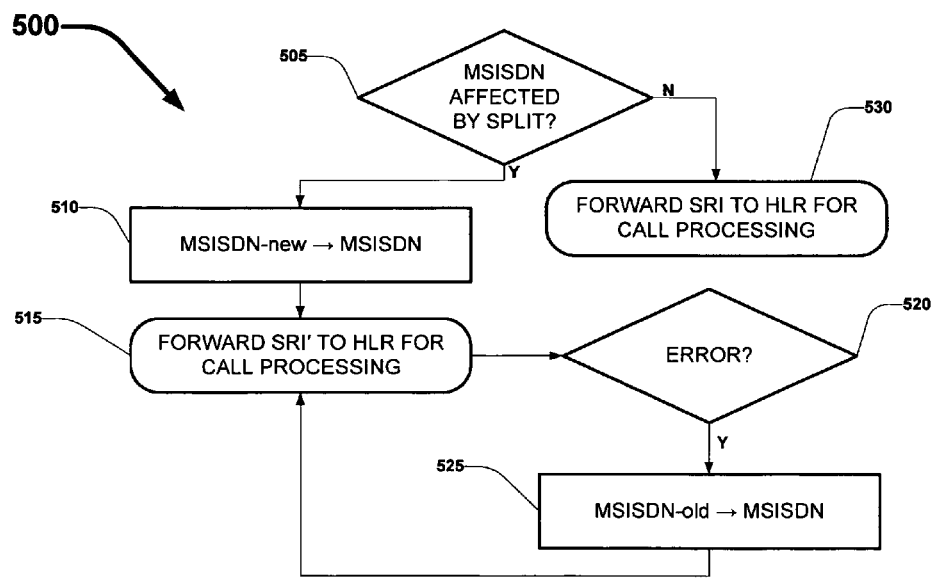
FIG. 5 is a flowchart showing an alternative method for mediating an NPA split, according to certain embodiments of the invention.

Method 500, shown in FIG. 5, is an alternative to the method 400. At step 505, the intelligent router determines whether the MSISDN included in the SRI delivered in step 365 is affected by the NPA split. If so, at step 510, the intelligent router 100 initially ensures that the SRI' includes the new version of the MSISDN, and at step 515, forwards the SRI' to the HLR 135. If the HLR 135 has not been updated, then at step 520, the intelligent router 100 receives an error message from the HLR 135. In response, at step 525, the intelligent router 100 modifies the SRI' such that it includes the version of the MSISDN with the old NPA, and resends the SRI' message at step 515. The intelligent router 100 may also annotate the record corresponding to the terminating wireless device 210 to indicate that the version of the MSISDN with the old NPA is to be sent for all subsequent calls, until the HLR 135 is updated. Therefore, the NPA mismatch must only be mediated once by repeat signaling.

If at step 505, if is determined that although the NPA was found to be affected by an NPA split (at step 370), the particular MSISDN extracted from the SRI was not affected, then at step 530, the original SRI is forwarded to the HLR for continued call processing.

In any case, the call will continue regardless of whether the HLR 135 has been updated to accommodate the NPA split. Furthermore, the intelligent router 100 can actually update the HLR 135 and other network elements as it mediates a call directed to a terminating wireless device 210 that has been affected by an NPA split and that is associated with a home HLR 135 that has not yet been updated. Returning to step 380, in these embodiments, the intelligent router 100 determines whether the dialed digits include the new NPA or the old NPA, and at step 385, the intelligent router 100 determines whether the HLR 135 has been updated. An additional step (not shown) can be inserted in the method 300 in which the intelligent router 100 sends a record update message to the HLR 135, or to another network element such as the central provisioning system, that causes the HLR 135 to substitute the new version of the MSISDN in the HLR record. The intelligent router 100 marks the corresponding record in its database to indicate that, with respect to that record, the HLR 135 has now been updated. The record update message may be formatted and transmitted using any known or yet to be developed signaling or messaging protocol, including SS7.

In response to receiving either the SRI or the SRI', the HLR 135 retrieves an address corresponding to the wireless device by sending a Provide Roaming Number (PRN) message to the VLR 140b to which the wireless device 210 associated with the IMSI is registered. The VLR 140b responds by sending the address in the form of a Mobile Station Roaming Number (MSRN) to the HLR 135 in a PRN acknowledgment message (PRN ACK). The HLR 135 forwards the MSRN to the MSC 150b in the visited network 220 in an SRI acknowledgment message (SRI ACK), and the MSC 150b completes the call using the MSRN provided.

Updating the intelligent router 100 to include the data required to mediate splits is much more straightforward than updating the HLR 135 and all affiliated network elements, and is transparent to the rest of the network 102. By updating the intelligent router 100, a central provisioning system or other intelligent router administrator can update the intelligent router 100, thereby deferring the need to update any other network element until such updates are necessary or convenient. To generate or update the tables maintained by the intelligent router 100, an IT professional or other user initiates a process similar to a translations update that is typically performed to update a switch or an HLR. The data needed to identify an NPA split and to mediate a mismatch are loaded, and any code or software needed to perform the methods of the invention is installed using methods known to those skilled in the art.

More specifically, the intelligent router 100 can be updated by accessing an interface that is associated with a processor that may be in the central provisioning system. The interface may include any means for inputting or outputting data or information, such as a keyboard, display device, mouse, touchpad, joystick, and the like. The processor is associated with volatile and non-volatile memory and other computer-readable media that facilitate computations and stores executable code that processes data entered by the user. The user downloads transfers, or otherwise enters data such as the old and new NPA codes affected by the NPA split, individual old and new directory numbers that are associated with the NPA split, update status of network elements, as well as other attributes of the NPA split, including duration of the permissive dialing period.

It must be emphasized that the law does not require and it is economically prohibitive to illustrate and teach every possible embodiment of the present claims. Hence, the above-described embodiments are merely exemplary illustrations of implementations set forth for a clear understanding of the principles of the invention, and are intended in all respects to be illustrative rather than restrictive. Many variations and modifications may be made to the above-described embodiments without departing from the scope of the claims. For example, the originating device 205 could be in a different PLMN 125 than the terminating wireless device 210, or could be a wireline device as opposed to a wireless device. The intelligent router 100 can be a physical or functional element that resides independently or at any suitable location or network node. An NPA split may necessitate a change of an NPA or of an NPA-NXX combination. Any variation may call different network elements into play and would change certain aspects of the environment of the invention, without departing from its scope. Furthermore, the principles of the invention are also applicable to data calls between the devices 205, 210. All such modifications, combinations, and variations are included herein by the scope of this disclosure and the following claims.

What is claimed is:

1. A system for routing a call to a recipient device in a wireless communications network in which a numbering plan area (NPA) split has been implemented, the wireless communications network having a plurality of network elements, the system comprising;
   an intelligent router in communication with a home location register (HLR), the intelligent router being configured for:
      intercepting a first request for routing information that is directed to the HLR, the first request including an NPA;
      analyzing the first request to determine whether the recipient device is affected by the NPA split;
      if the recipient device is affected by the NPA split:
         determining a status of the HLR, the status indicating whether the HLR has been updated to recognize a post-split value of the NPA;
         if the HLR has not been updated and if the first request contains the post-split value of the NPA, then modifying the first request to include the pre-split value of the NPA; and
         if the HLR has been updated and if the first request contains the pre-split value of the NPA, then modifying the first request to include the post-split value of the NPA;
         if the HLR has not been updated to accept the post-split value of the NPA in the first request, receiving from the HLR an error message indicating that the HLR has not been updated to accept the post-split value of the NPA in the first request;
         in response to receiving the error message, modifying the request to include the pre-split value of the NPA, to create a modified first request, and transmitting the modified first request to the HLR;
         maintaining a status indicator that, in a first state, indicates that the HLR has been updated to accept the post-split value of the NPA in the first request, and that in a second state, indicates that the HLR has not been updated to accept the post-split value of the NPA in the first request;
         in response to receiving the error message, changing the status indicator from the first state to the second state;
         receiving a subsequent request for routing information, the subsequent request being addressed to the HLR and including a subsequent NPA;
         determining whether the subsequent NPA in the subsequent request is one of the directory numbers affected by the NPA split;
         if the directory number in the subsequent request is one of the directory numbers affected by the NPA split, then checking the status indicator;
         if the status indicator is in the first state and if the NPA portion of the subsequent NPA in the subsequent request contains the pre-split value, then modifying the subsequent request to include the post-split value of the subsequent NPA, thereby forming a modified subsequent request, and transmitting the modified subsequent request to the HLR; and
         if the status indicator is in the second state and if the NPA portion of the subsequent NPA in the subsequent request contains the post-split value, then modifying the subsequent request to include the pre-split value of the NPA and transmitting the modified subsequent request to the HLR.

2. The system of claim 1, wherein the intelligent router is further configured for transmitting the first request to the HLR for call processing after modifying the first request to form a modified first request.

3. The system of claim 2, wherein in response to receiving the modified first request, the HLR uses the information in the modified first request to retrieve an address for use in completing the call to the recipient device.

4. A system for routing a call to a mobile station in a wireless communications network in which a numbering plan area (NPA) split that affects at least some of a plurality of directory numbers in the wireless communications network has been implemented, the wireless communications network having a plurality of network elements, the system comprising:

an intelligent router communicatively coupled to a home location register (HLR) the intelligent router being configured for:

receiving information defining the NPA split that requires each of the directory numbers affected by the NPA split to be converted from a first version to a second version by changing an NPA portion of each of the affected directory numbers from a pre-split value to a post-split value;

receiving a first request for routing information, the first request being addressed to the HLR and, the first request including a directory number associated with the mobile station;

determining whether the directory number in the first request is one of the directory numbers affected by the NPA split; and if the directory number in the first request is one of the directory numbers affected by the NPA split:

determining a status of the HLR, the status indicating whether the HLR has been updated to accept the second version of the directory number in the first request;

if the HLR has not been updated and if the NPA portion of the directory number in the first request contains the post-split value, then modifying the first request to include the first version of the directory number in the first request; and if the HLR has been updated and if the NPA portion of the directory number in the first request contains the pre-split value, then modifying the first request to include the second version of the directory number in the first request;

if the HLR has not been updated to accept the second version of the directory number in the first request, receiving an error message from the HLR, the error message indicating that the HLR has not been updated to accept the second version of the directory number in the first request;

in response to receiving the error message, modifying the first request to include the first version of the directory number, to create a modified request, and transmitting the modified request to the HLR;

maintaining a status indicator that, in a first state, indicates that the HLR has been updated to accept the second version of the directory number in the first request, and that in a second state, indicates that the HLR has not been updated to accept the second version of the directory number in the first request;

in response to receiving the error message, changing the status indicator from the first state to the second state;

receiving a subsequent request for routing information, the subsequent request being addressed to the HLR and including a subsequent directory number;

determining whether the subsequent directory number in the subsequent request is one of the directory numbers affected by the NPA split;

if the subsequent directory number in the subsequent request is one of the directory numbers affected by the NPA split, then checking the status indicator;

if the status indicator is in the first state and if the NPA portion of the subsequent directory number in the subsequent request contains the pre-split value, then modifying the subsequent request to include the second version of the directory number and transmitting the modified subsequent request to the HLR; and if the status indicator is in the second state and if the NPA portion of the subsequent directory number in the subsequent request contains the post-split value, then modifying the subsequent request to include the first version of the directory number and transmitting the modified subsequent request to the HLR.

5. The system of claim 4, wherein the intelligent router is further configured for transmitting the first request to the HLR for call processing, after modifying the request.

6. The system of claim 4, wherein modifying the first request to include the first version comprises changing the post-split value to the pre-split value in the NPA portion of the directory number in the first request.

7. The system of claim 4, wherein modifying the first request to include the second version comprises changing the pre-split value to the post-split value in the NPA portion of the directory number in the first request.

8. The system of claim 4, wherein the NPA portion contains an NPA code.

9. The system of claim 4, wherein the NPA portion contains an NPA code and a central office code.

10. The system of claim 4, wherein receiving information defining the NPA split comprises receiving at least one of the following:

a duration of a permissive dialing (PD) period, a start of the PD period, an end of the PD period, the affected directory numbers, the update status of the HLR, the pre-split values of the NPAs, and the post-split values of NPAs.

11. The system of claim 4, wherein the intelligent router is integral to the HLR.

12. The system of claim 4, wherein the intelligent router is integral to a network node.

13. The system of claim 4, wherein the first request further comprises a local routing number (LRN).

14. The system of claim 5, wherein in response to receiving the modified request, the HLR uses the information in the modified request to retrieve an address for use in completing the call to the mobile station.

15. A system for routing a call to a mobile station in a wireless communications network in which a numbering plan area (NPA) split that affects at least some of a plurality of directory numbers in the wireless communications network has been implemented, the wireless communications network having a plurality of network elements, the system comprising:

an intelligent router operatively coupled to a home location register (HLR), the intelligent router being for:

receiving information defining the NPA split that requires each of the directory numbers affected by the NPA split to be converted from a first version to a second version by changing an NPA portion of each of the affected directory numbers from a pre-split value to a post-split value;

receiving a first request for routing information, the first request being addressed to the HLR and, the first request including a directory number associated with the mobile station;

determining whether the directory number in the first request is one of the directory numbers affected by the NPA split;

if the directory number in the first request is one of the directory numbers affected by the NPA split and if the NPA portion of the directory number in the first request contains the pre-split value, then modifying the first request to include the second version of the directory number, to form a modified first request, and transmitting the modified first request to the HLR for call processing, if the HLR has not been updated to accept the second version of the directory number in the first request, receiving an error message from the HLR, the error message indicating that the HLR has not been updated to accept the second version of the directory number in the first request;

in response to receiving the error message, modifying the first request to include the first version of the directory number, thereby forming a modified first request, and transmitting the modified first request to the HLR;

maintaining a status indicator that, in a first state, indicates that the HLR has been updated to accept the second version of the directory number in the first request, and that in a second state, indicates that the HLR has not been updated to accept the second version of the directory number in the first request;

in response to receiving the error message, changing the status indicator from the first state to the second state;

receiving a subsequent request for routing information, the subsequent request being addressed to the HLR and including a subsequent directory number;

determining whether the subsequent directory number in the subsequent request is one of the directory numbers affected by the NPA split;

if the subsequent directory number in the subsequent request is one of the directory numbers affected by the NPA split, then checking the status indicator;

if the status indicator is in the first state and if the NPA portion of the subsequent directory number in the subsequent request contains the pre-split value, then modifying the subsequent request to include the second version of the directory number, thereby forming a modified subsequent request, and transmitting the modified subsequent request to the HLR; and if the status indicator is in the second state and if the NPA portion of the subsequent directory number in the subsequent request contains the post-split value, then modifying the subsequent request to include the first version of the directory number and transmitting the modified subsequent request to the HLR.

16. The system of claim 15, wherein the intelligent router is further configured for:

receiving an error message from the HLR, the error message indicating that the HLR has not been updated to accept the second version of the directory number in the first request;

in response to receiving the error message, causing the HLR to transmit the modified first request to the HLR.

17. The system of claim 15, wherein the NPA portion contains an NPA code.

18. The system of claim 15, wherein the NPA portion contains an NPA code and a central office code.

19. The system of claim 15, wherein receiving information defining the NPA split comprises receiving at least one of the following:

a duration of a permissive dialing (PD) period, a start of the PD period, an end of the PD period, the affected directory numbers, the update status of the HLR, the pre-split values of the NPAs, and the post-split values of affected NPAs.

20. The system of claim 15, wherein the intelligent router is integral to the HLR.

21. The system of claim 15, wherein the intelligent router is integral to a network node.

22. The system of claim 15, wherein the first request further comprises a local routing number (LRN).

\* \* \* \* \*